US008914560B2

(12) United States Patent
Katoh

(10) Patent No.: US 8,914,560 B2
(45) Date of Patent: Dec. 16, 2014

(54) COMMUNICATION CONTROL DEVICE FOR SELECTING A PATH UNDER DIFFERENT LOADS—HIGH, MIDDLE, OR LOW LOADS—BASED ON WHETHER A PROHIBITION PERIOD HAS PASSED

(75) Inventor: Tadasuke Katoh, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 13/527,632

(22) Filed: Jun. 20, 2012

(65) Prior Publication Data

US 2013/0036244 A1 Feb. 7, 2013

(30) Foreign Application Priority Data

Aug. 5, 2011 (JP) ................................ 2011-172177

(51) Int. Cl.
*G06F 13/00* (2006.01)
(52) U.S. Cl.
USPC ............ 710/38; 710/37; 370/256; 370/310.1; 370/413
(58) Field of Classification Search
USPC .............................. 710/37–38; 370/256, 310.1
See application file for complete search history.

(56) References Cited

U.S. PATENT DOCUMENTS

| 5,640,600 | A | 6/1997 | Satoh et al. | |
|---|---|---|---|---|
| 5,898,815 | A | 4/1999 | Bluhm et al. | |
| 6,600,724 | B1 * | 7/2003 | Cheng | 370/256 |
| 6,956,821 | B2 * | 10/2005 | Szviatovszki et al. | 370/237 |
| 7,436,789 | B2 * | 10/2008 | Caliskan et al. | 370/310.1 |
| 7,724,674 | B2 * | 5/2010 | Lysne | 370/238 |
| 7,840,703 | B2 * | 11/2010 | Arimilli et al. | 709/239 |
| 7,948,996 | B2 * | 5/2011 | Kompella | 370/400 |
| 8,098,539 | B2 | 1/2012 | Sankuratri et al. | |
| 2012/0020372 | A1 * | 1/2012 | Nakashima et al. | 370/413 |

FOREIGN PATENT DOCUMENTS

| JP | 7-225737 | 8/1995 |
|---|---|---|
| JP | 2007-025839 | 2/2007 |

OTHER PUBLICATIONS

Extended European Search Report dated Nov. 30, 2012 for corresponding European Application No. 12172933.9.

* cited by examiner

*Primary Examiner* — Tammara Peyton
(74) *Attorney, Agent, or Firm* — Fujitsu Patent Center

(57) ABSTRACT

An IOP 14 includes a path-state determining unit 54 and a path selecting unit 55. The path-state determining unit 54 determines whether there is any path which is neither in process of data transmission nor in a prohibition period in which data transmission is prohibited for a predetermined time since the last data transmission has been completed out of multiple paths connecting a device to a communication partner device. When the path-state determining unit 54 determines that there is no path which is neither in process of data transmission nor in the prohibition period, the path selecting unit 55 selects a path which completes data transmission but does not pass through the prohibition period as a path for data transmission.

19 Claims, 12 Drawing Sheets

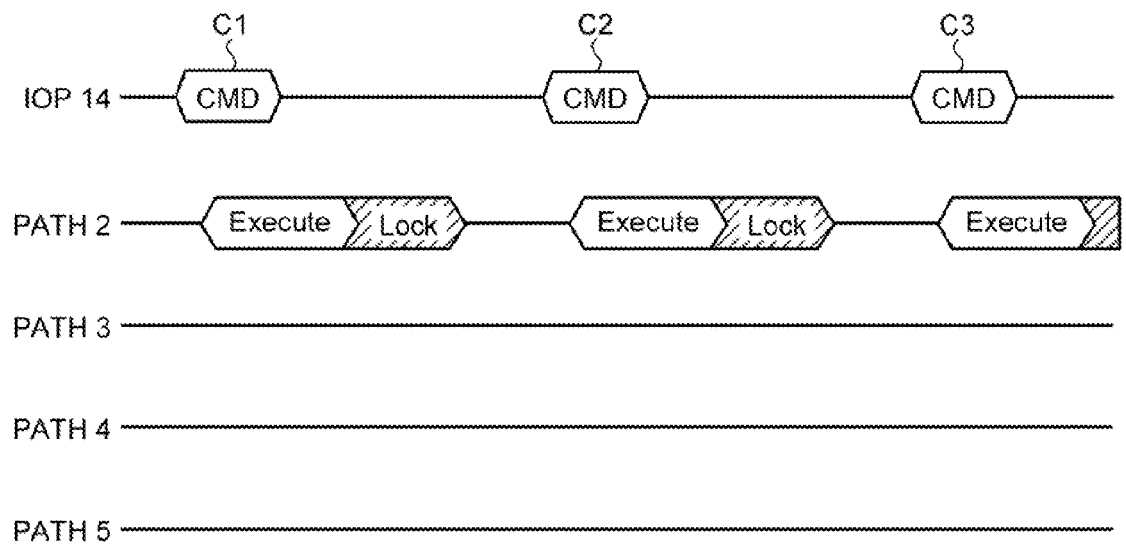
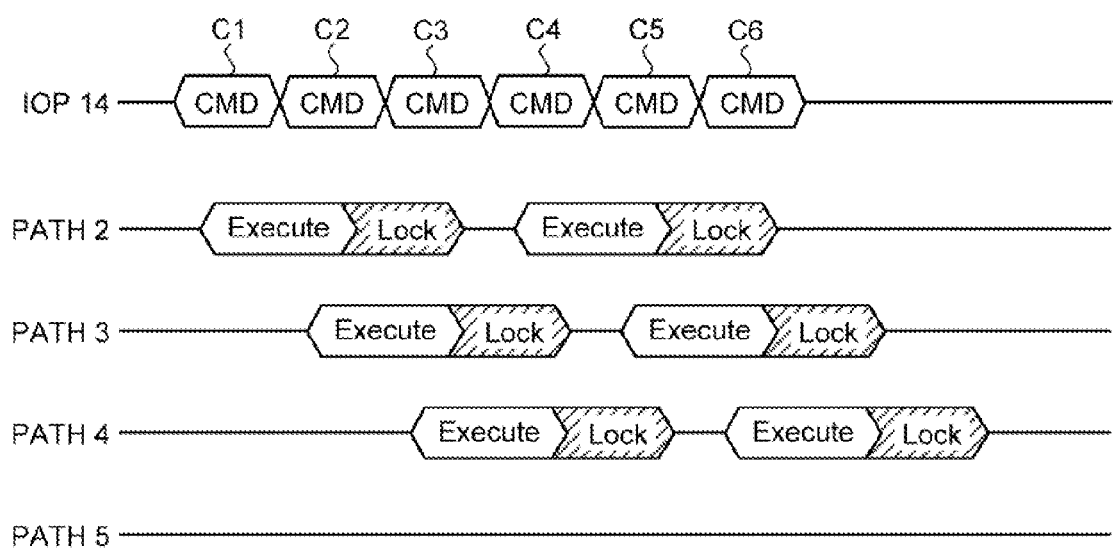

FIG.9

| PATH ID | ISSUE OF CMD | CMD_End TIME | Lock_End ESTIMATED TIME |
|---------|--------------|--------------|-------------------------|
| xxx2 | 00:05:003 | 00:05:175 | 00:05:475 |
| xxx3 | 00:05:137 | – | – |
| xxx4 | – | – | – |
| xxx5 | – | – | – |

FIG.10

| PATH ID | REFERENCE PATH FLAG | POWER FLAG |
|---------|---------------------|------------|
| xxx2 | 1 | ON |
| xxx3 | 0 | ON |
| xxx4 | 0 | ON |
| xxx5 | 0 | OFF |

# COMMUNICATION CONTROL DEVICE FOR SELECTING A PATH UNDER DIFFERENT LOADS—HIGH, MIDDLE, OR LOW LOADS—BASED ON WHETHER A PROHIBITION PERIOD HAS PASSED

CROSS-REFERENCE TO RELATED APPLICATION

This application is based upon and claims the benefit of priority of the prior Japanese Patent Application No. 2011-172177, filed on Aug. 5, 2011, the entire contents of which are incorporated herein by reference.

FIELD

The embodiments discussed herein are related to a communication control device, an information processing apparatus, and a path selecting method.

BACKGROUND

Conventionally, in the execution of input/output processing between a server and an IO (Input Output) device, the server issues a command to the IO device. The server that executes the input/output processing with the IO device is explained with reference to FIG. 16.

FIG. 16 is a diagram illustrating a configuration of a server that executes input/output processing with an IO device. As illustrated in FIG. 16, a server 910 includes interfaces (I/Fs) 911 to 914 and a central processing unit (CPU) 915; the I/Fs 911 to 914 and the CPU 915 are connected by an internal bus. An IO device 920 includes I/Fs 921 to 924 and an I/O unit 925; the I/Fs 921 to 924 and the I/O unit 925 are connected by an internal bus.

The I/F 911 included in the server 910 is connected to the I/F 921 included in the IO device 920 by a path 901, such as an optical cable. Likewise, the I/F 912 and the I/F 922 are connected by a path 902; the I/F 913 and the I/F 923 are connected by a path 903; the I/F 914 and the I/F 924 are connected by a path 904.

When the server 910 communicates with the IO device 920 via, for example, the path 901, the CPU 915 issues a command to the I/F 911 connected to the path 901. Then, the I/F 911 converts the command issued by the CPU 915 into a signal meeting the standard of the I/F 911, and transmits the signal to the path 901. The IO device 920 causes the I/F 921 to convert the signal received from the server 910 into a command and output the command to the I/O unit 925. Incidentally, when the IO device 920 establishes communication with the server 910, the relationship between the server 910 and the IO device 920 is exchanged, and the IO device 920 executes the same processing as the server 910.

The CPU 915 selects any of the I/Fs 911 to 914 to which a command is to be issued. For example, in the selection of an I/F, the CPU 915 sets a path connected to the first selected I/F as a reference path, and sequentially determines whether each of the paths, including the reference path, connected to the I/Fs is available.

A path selecting method when a reference path has been set is explained with reference to FIG. 17. FIG. 17 is a diagram illustrating the path selecting method when a reference path has been set. Here, there is described a case where the path 901 has been set as a reference path, and the CPU 915 issues a command C1, a command C2, a command C3, a command C4, and a command C5 in sequence.

As illustrated in FIG. 17, when issuing the command C1, the CPU 915 selects the reference path 901 first, and determines whether the path 901 is available. When determined that the path 901 is available, the CPU 915 issues the command C1 to the I/F 911 connected to the path 901. As a result, a state of the path 901 is changed to Execute indicating that the command is being executed. While the state of the path 901 is Execute, the CPU 915 does not issue another command to the I/F 911 connected to this path 901.

Next, when issuing the command C2, the CPU 915 selects the reference path 901 first, and determines whether the path 901 is available. As the state of the path 901 is Execute, the CPU 915 determines that the path 901 is not available. Then, the CPU 915 selects the path 902 next, and determines whether the path 902 is available. When determined that the path 902 is available, the CPU 915 issues the command C2 to the I/F 912 connected to the path 902. As a result, a state of the path 902 is changed to Execute. Incidentally, the same is true when the CPU 915 issues the commands C3 to C5.

Furthermore there is known a technology to select a path to be used in round-robin fashion and issue a command. A path selecting method in round-robin fashion is explained with reference to FIG. 18. FIG. 18 is a diagram illustrating the path selecting method in round-robin fashion. Here, there is described a case where the CPU 915 issues a command C1, a command C2, a command C3, a command C4, and a command C5 in sequence, and selects a path to be used in order of the path 901, the path 902, the path 903, and the path 904.

As illustrated in FIG. 18, the CPU 915 issues the command C1 to the I/F 911 connected to the path 901, and issues the command C2 to the I/F 912 connected to the path 902. Furthermore, the CPU 915 issues the command C3 to the I/F 913 connected to the path 903, and issues the command C4 to the I/F 914 connected to the path 904. Then, upon completion of the transmission of the command C1 via the path 901, the CPU 915 issues the command C5 to the I/F 911 connected to the path 901.

[Patent document 1] Japanese Laid-open Patent Publication No. 2007-25839

[Patent document 2] Japanese Laid-open Patent Publication No. 07-225737

However, the above-described conventional technologies have a problem that it is not possible to use paths efficiently.

Specifically, when a reference path is set, only the reference path may be used. For example, when the CPU 915 issues a new command C2 after completion of the transmission of a command C1 via the reference path 901, the CPU 915 issues the command C2 to the I/F 911 connected to the reference path 901. In the same way, when the CPU 915 issues a new command C3 after completion of the transmission of the command C2, the CPU 915 issues the command C3 to the I/F 911 connected to the reference path 901. As a result, the loads on the I/Fs 911 and 921 connected to the reference path 901 are increased, and a heating value is increased. Electronic components included in the I/Fs 911 and 921 are sensitive to heat; therefore, if a heating value is increased, the electronic components are worn.

Furthermore, when a path to be used is selected in round-robin fashion, all the paths 901 to 904 are used in sequence. If the command issue interval is long, the number of paths with respect to the number of commands to be issued is too many. Furthermore, in this case, all the paths 901 to 904 are supplied with electric power, so power consumption is high.

SUMMARY

According to an aspect of an embodiment of the invention, a communication control device includes a determining unit that determines whether there is any path which is neither in process of data transmission nor in a prohibition period in which data transmission is prohibited for a predetermined time since the last data transmission has been completed out of multiple paths connecting the communication control device to a communication partner device; and a selecting unit that selects a path which completes data transmission but does not pass through the prohibition period as a path for data transmission when the determining unit determines that there is no path which is neither in process of data transmission nor in the prohibition period.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating a path selecting process under a low-load condition;

FIG. 4 is a diagram illustrating the path selecting process under a medium-load condition;

FIG. 9 is a diagram illustrating an example of information stored as a timestamp management table;

FIG. 10 is a diagram illustrating an example of information stored as a reference-path management table;

DESCRIPTION OF EMBODIMENTS

Preferred embodiments of the present invention will be explained with reference to accompanying drawings.

Incidentally, the present invention is not limited to the embodiments. The embodiments can be arbitrarily combined within a scope which does not contradict processing contents.

[a] First Embodiment

System Configuration

Figure 1:
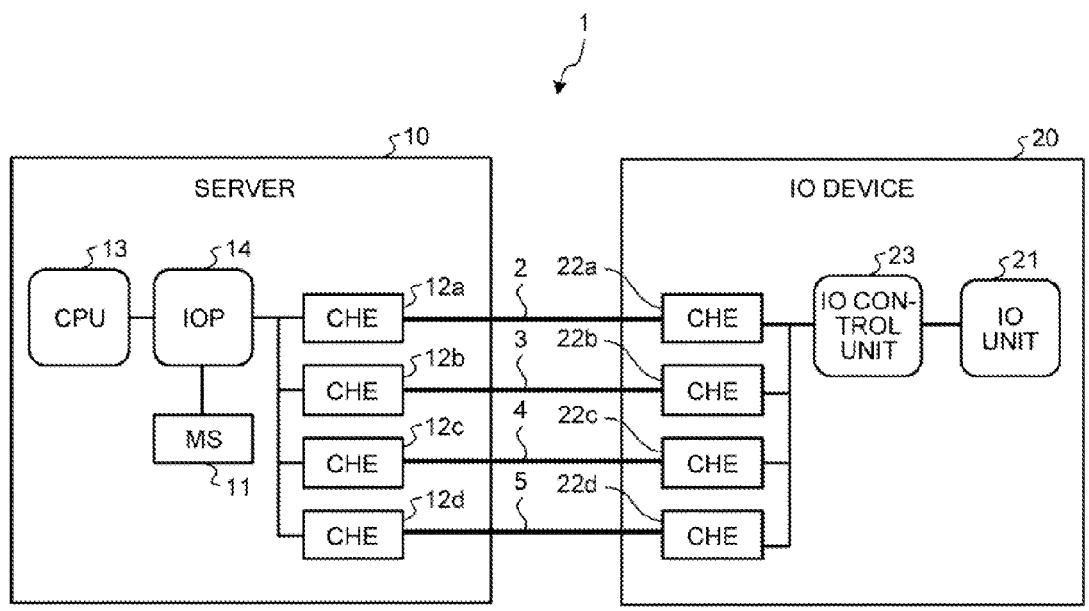
FIG. 1 is a block diagram illustrating a configuration of an information processing system according to a first embodiment.

FIG. 1 is a block diagram illustrating a configuration of an information processing system according to a first embodiment. As illustrated in FIG. 1, an information processing system 1 includes a server 10 and an IO (Input Output) device 20. The server 10 and the IO device 20 are connected by paths 2 to 5 so as to communicate with each other.

The server 10 is, for example, a mainframe server, and includes a main storage (MS) 11, channel elements (CHEs) 12a to 12d, a central processing unit (CPU) 13, and an I/O processor (IOP) 14. The MS 11 stores therein various information used in arithmetic processing.

The CHEs 12a to 12d are interface units for communication with the IO device 20. The CHE 12a is connected to the IO device 20 via the path 2; the CHE 12b is connected to the IO device 20 via the path 3; the CHE 12c is connected to the IO device 20 via the path 4; the CHE 12d is connected to the IO device 20 via the path 5. Incidentally, the number of paths connecting the server 10 to the IO device 20 and the number of CHEs that the server 10 and the IO device 20 each include are not limited to four, and can be any number as long as it is plural.

The IOP 14 issues a command requesting data input/output to the CHEs 12a to 12d in response to a request for data input/output from the CPU 13. The CHEs 12a to 12d execute a command accepted from the IOP 14. Specifically, the CHEs 12a to 12d convert a command accepted from the IOP 14 into a signal requesting data input/output, and transmit the converted signal to the IO device 20. Then, upon completion of the execution of the command accepted from the IOP 14, the CHEs 12a to 12d notify the IOP 14 of a response indicating that the execution of the command has been completed (hereinafter, referred to as "CMD End").

Furthermore, after completion of the execution of the command, the CHEs 12a to 12d set a prohibition period indicating that the use of the connected path is prohibited for a predetermined period of time. Then, after the end of the prohibition period, the CHEs 12a to 12d allow the use of the path and execute a command accepted.

The CPU 13 performs various arithmetic processing. Furthermore, when a signal requesting data input/output is transmitted to the IO device 20, the CPU 13 causes the IOP 14 to issue a corresponding command. As a result, the IOP 14 selects any of the CHEs, thereby selecting a path through which the signal requesting data input/output is to be transmitted to the IO device 20.

The IOP 14 is connected to the MS 11, the CHEs 12a to 12d, and the CPU 13, and controls, for example, the input/output of data to the MS 11 conducted by the CPU 13. Furthermore, the IOP 14 controls the input of data accepted from the IO device 20 to the MS 11. Incidentally, the IOP 14 is a processor provided to reduce the processing load of the CPU 13 in the server 10.

When the IOP 14 has accepted a request for data input/output to the IO device 20 from the CPU 13, the IOP 14 selects any of the CHEs to which a corresponding command is to be issued. For example, the IOP 14 determines whether there is any CHE which is neither in process of command execution nor in the prohibition period. Here, when determined that there is a CHE which is neither in process of data transmission nor in the prohibition period, the IOP 14 issues a command to the CHE.

Furthermore, when there is no CHE which is neither in process of command execution nor in the prohibition period but there is a CHE which is in the prohibition period, the IOP 14 issues a new command to the CHE which is in the prohibition period. Moreover, when the IOP 14 has determined that all the CHEs are in process of command execution, after the elapse of a predetermined period of time, the IOP 14 again determines whether there is any CHE which is neither in process of command execution nor in the prohibition period.

The IO device 20 includes an IO unit 21, CHEs 22a to 22d, and an IO control unit 23.

The IO unit 21 is a storage device such as a hard disk drive (HDD), and stores therein data and a program, etc. Incidentally, here, the IO unit 21 is explained as a storage device such as an HDD; however, the IO unit 21 is not limited to a storage device such as an HDD, and can be various data input/output devices, such as various sensors, a printer, and a display.

The CHEs 22a to 22d are interfaces to the server 10. The CHE 22a is connected to the server 10 via the path 2; the CHE 22b is connected to the server 10 via the path 3; the CHE 22c is connected to the server 10 via the path 4; the CHE 22d is connected to the server 10 via the path 5.

The IO control unit 23 controls the input/output of data accepted via the CHEs 22a to 22d to the IO unit 21.

Command Executing Process in Information Processing System

Figure 2:
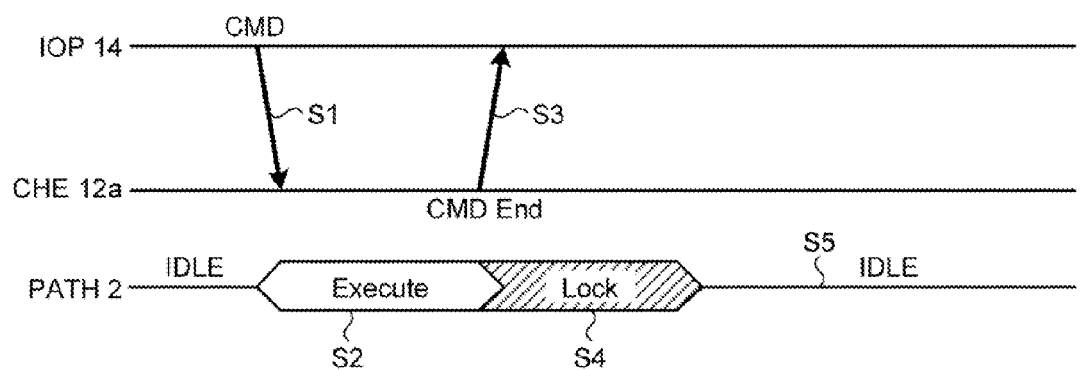
FIG. 2 is a diagram illustrating a command executing process in the information processing system.

Subsequently, a command executing process in the information processing system 1 is explained with reference to FIG. 2. FIG. 2 is a diagram illustrating the command executing process in the information processing system 1. Incidentally, here, the CHE 12a is explained as a representative of the CHEs 12a to 12d.

When accepted a command from the IOP 14 (Step S1), the CHE 12a changes the state of the path 2 from IDLE to Execute and executes the command (Step S2). Here, the path state is IDLE, which indicates that the CHE is neither in process of command execution nor in the prohibition period and is able to execute a command. Furthermore, the path state is Execute, which indicates that the CHE is in process of command execution. While the state of the path 2 is Execute, the IOP 14 does not issue another command to the path 2.

Upon completion of the execution of the command, the CHE 12a notifies the IOP 14 of CMD End (Step S3). Then, the CHE 12a changes the state of the path 2 from Execute to Lock (Step S4). Here, the path state is Lock, which indicates that the CHE is not in process of command execution but in the prohibition period. Namely, the IOP 14 notified of CMD End can resume the process; however, if the IOP 14 issues a command to the same CHE, the IOP 14 has to wait until the CHE has passed through the prohibition period.

Then, after the passage of the prohibition period, the CHE 12a changes the state of the path 2 from Lock to IDLE (Step S5).

Path Selecting Process

Figure 5:
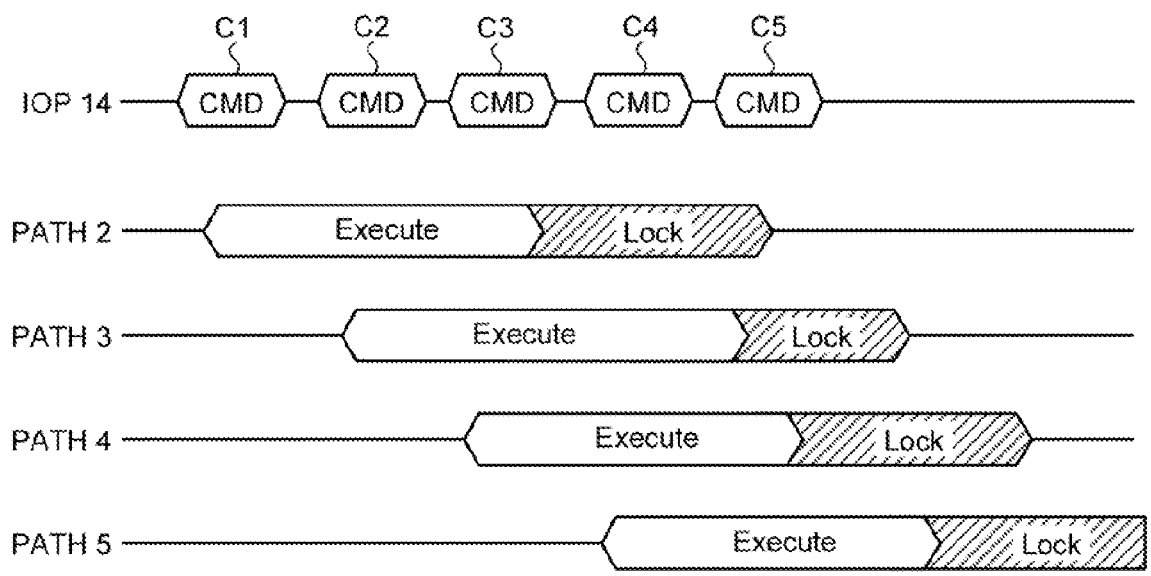
FIG. 5 is a diagram illustrating the path selecting process under a high-load condition.

Subsequently, a path selecting process is explained with reference to FIGS. 3 to 5. FIG. 3 is a diagram illustrating the path selecting process under a low-load condition; FIG. 4 is a diagram illustrating the path selecting process under a medium-load condition; FIG. 5 is a diagram illustrating the path selecting process under a high-load condition.

Incidentally, the low-load condition is, for example, in a case where the next command is issued after the end of the prohibition period since the last issued command has been executed by the CHE. Furthermore, the medium-load condition is, for example, in a case where the next command is issued before the end of the prohibition period since the last issued command has been executed by the CHE; however, all the paths are not in the state other than IDLE at the same time. Moreover, the high-load condition is, for example, in a case where the next command is issued before the end of the prohibition period since the last issued command has been executed by the CHE, and all the paths can be in the state other than IDLE at the same time. Incidentally, IDLE is a state where the path is available.

Path Selection Under Low-Load Condition

As illustrated in FIG. 3, when the IOP 14 has accepted an instruction to issue a command C1 from the CPU 13, the states of the paths 2 to 5 are all IDLE, so the IOP 14 issues the command to the CHE 12a connected to the path 2.

Then, when the IOP 14 has accepted an instruction to issue a command C2 from the CPU 13, the states of the paths 2 to 5 are all IDLE, so the IOP 14 issues the command to the CHE 12a connected to the path 2. Likewise, when the IOP 14 has accepted an instruction to issue a command C3 from the CPU 13, the states of the paths 2 to 5 are all IDLE, so the IOP 14 issues the command to the CHE 12a connected to the path 2.

Path Selection Under Medium-Load Condition

As illustrated in FIG. 4, when the IOP 14 has accepted an instruction to issue a command C1 from the CPU 13, the states of the paths 2 to 5 are all IDLE, so the IOP 14 issues the command to the CHE 12a connected to the path 2.

Then, when the IOP 14 has accepted an instruction to issue a command C2 from the CPU 13, the state of the path 2 is Execute and the states of the paths 3 to 5 are IDLE, so the IOP 14 issues the command to the CHE 12b connected to the path 3.

And then, when the IOP 14 has accepted an instruction to issue a command C3 from the CPU 13, the state of the path 2 is Lock, the state of the path 3 is Execute, and the states of the paths 4 and 5 are IDLE, so the IOP 14 issues the command to the CHE 12c connected to the path 4.

And then, when the IOP 14 has accepted an instruction to issue a command C4 from the CPU 13, the states of the paths 2 and 5 are IDLE, the state of the path 3 is Lock, and the state of the path 4 is Execute, so the IOP 14 issues the command to the CHE 12a connected to the path 2.

And then, when the IOP 14 has accepted an instruction to issue a command C5 from the CPU 13, the state of the path 2 is Execute, the states of the paths 3 and 5 are IDLE, and the state of the path 4 is Lock, so the IOP 14 issues the command to the CHE 12b connected to the path 3.

And then, when the IOP 14 has accepted an instruction to issue a command C6 from the CPU 13, the state of the path 2 is Lock, the state of the path 3 is Execute, and the states of the paths 4 and 5 are IDLE, so the IOP 14 issues the command to the CHE 12c connected to the path 4.

Path Selection Under High-Load Condition

As illustrated in FIG. 5, when the IOP 14 has accepted an instruction to issue a command C1 from the CPU 13, the states of the paths 2 to 5 are all IDLE, so the IOP 14 issues the command to the CHE 12a connected to the path 2.

Then, when the IOP 14 has accepted an instruction to issue a command C2 from the CPU 13, the state of the path 2 is Execute and the states of the paths 3 to 5 are IDLE, so the IOP 14 issues the command to the CHE 12b connected to the path 3.

And then, when the IOP 14 has accepted an instruction to issue a command C3 from the CPU 13, the states of the paths 2 and 3 are Execute and the states of the paths 4 and 5 are IDLE, so the IOP 14 issues the command to the CHE 12c connected to the path 4.

And then, when the IOP 14 has accepted an instruction to issue a command C4 from the CPU 13, the state of the path 2 is Lock, the states of the paths 3 and 4 are Execute, and the state of the path 5 is IDLE, so the IOP 14 issues the command to the CHE 12*d* connected to the path 5.

And then, when the IOP 14 has accepted an instruction to issue a command C5 from the CPU 13, the state of the path 2 is Lock and the states of the paths 3 to 5 are Execute, so the IOP 14 determines that none of the paths is in IDLE state. In this case, the IOP 14 issues the command to the CHE 12*a* connected to the path 2 of which the state is Lock.

As described above, in the information processing system 1, biased distribution of heat generation of elements on a circuit board can be mitigated by controlling bias in the use of paths, thereby controlling the biased loads on the elements.

Configuration of CHE

Figure 6:
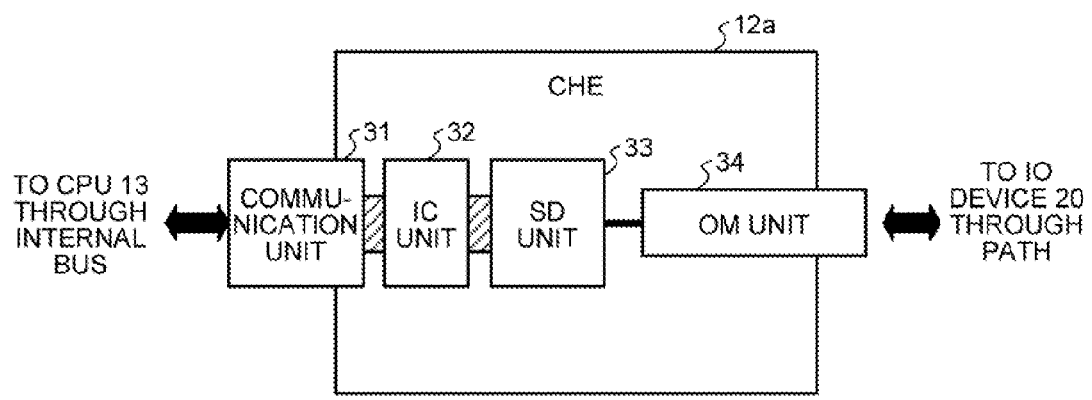
FIG. 6 is a block diagram illustrating a configuration of a CHE.

Subsequently, a configuration of the CHE is explained with reference to FIG. 6. FIG. 6 is a block diagram illustrating the configuration of the CHE. As illustrated in FIG. 6, the CHE 12*a* includes a communication unit 31, an integrated circuit (IC) unit 32, a serial deserial (SD) unit 33, and an optical module (OM) unit 34. The communication unit 31 and the IC unit 32 are connected via a plurality of buses, and the IC unit 32 and the SD unit 33 are connected via a plurality of buses. Furthermore, the SD unit 33 and the OM unit 34 are connected via a single bus.

The communication unit 31 outputs a command parallelly input from the IOP 14 to the IC unit 32. The IC unit 32 interprets the command parallelly input from the communication unit 31, and outputs the command to the SD unit 33. The SD unit 33 serializes the command parallelly input from the IC unit 32, and outputs the serialized command to the OM unit 34. The OM unit 34 converts the serialized command into an optical signal, and sends the optical signal to the path 2.

Furthermore, the OM unit 34 converts an optical signal serially received via the path 2 into an electrical signal, and outputs the electrical signal to the SD unit 33. The SD unit 33 parallelizes the signal serially input from the OM unit 34, and outputs the parallelized signal to the IC unit 32. The communication unit 31 outputs the signal parallelly input from the IC unit 32 to the CPU 13.

Figure 7:
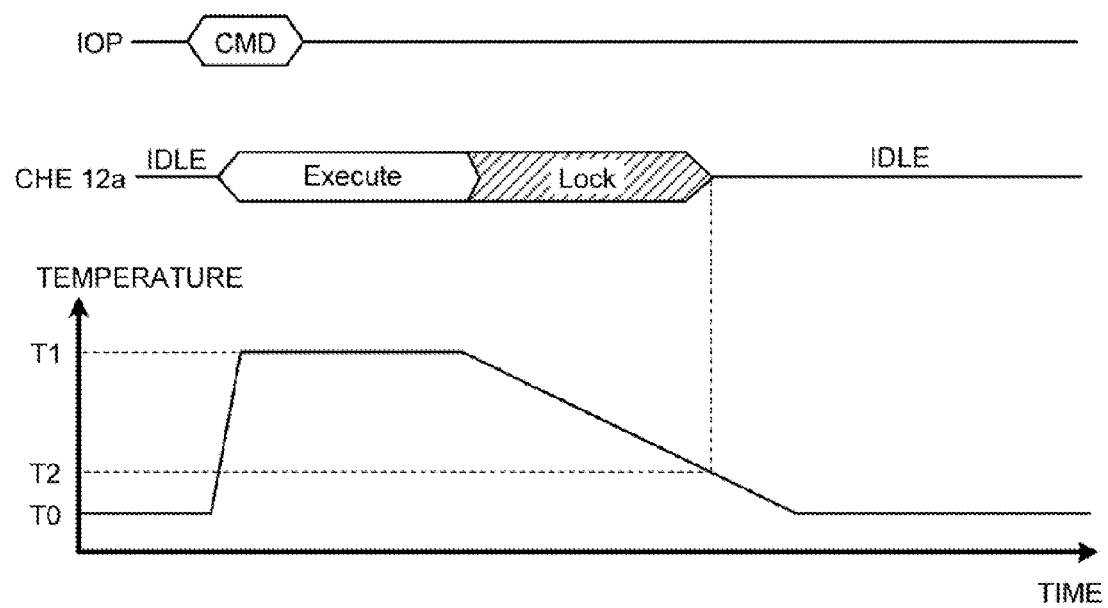
FIG. 7 is a diagram illustrating the setting of a prohibition period.

In this CHE 12*a*, the IC unit 32 sets a prohibition period. This prohibition period is set according to a period of time required to dissipate heat generated in the SD unit 33 or the OM unit 34 by data transmission. Namely, the prohibition period is appropriately set on the basis of the heat dissipation of the SD unit 33 or the OM unit 34. The setting of a prohibition period is explained with reference to FIG. 7. FIG. 7 is a diagram illustrating the setting of a prohibition period.

As illustrated in FIG. 7, when the CHE 12*a* executes an accepted command, the temperature of the SD unit 33 or the OM unit 34 rises from T0 to T1. The temperature of the OM unit 34 is kept at the temperature T1 during the execution of the command, and upon completion of the execution of the command, the temperature decreases to T0 again.

A prohibition period is set to a time required to cool the SD unit 33 or the OM unit 34 from the temperature T1 to a temperature T2. Incidentally, this prohibition period is set according to the heat dissipation of the SD unit 33 or the OM unit 34, and a value of the temperature T2 can be arbitrarily set on the basis of values of the temperatures T0 and T1 according to the heat dissipation of the SD unit 33 or the OM unit 34.

Configuration of IOP

Figure 8:
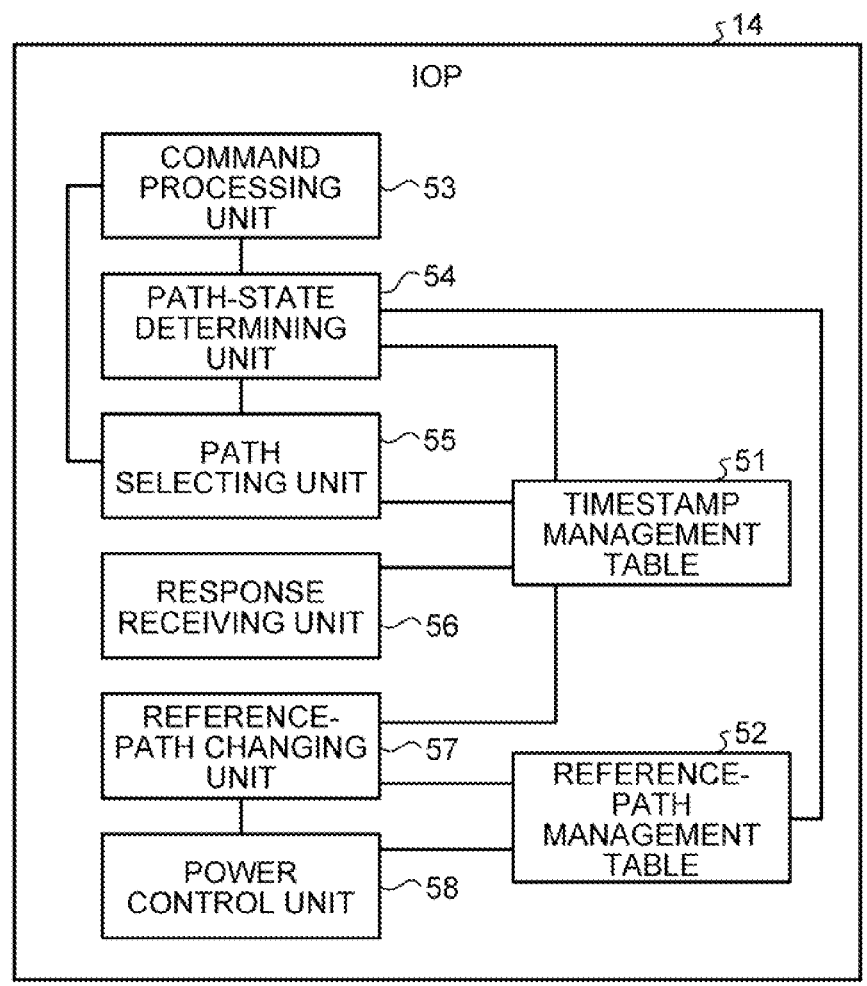
FIG. 8 is a functional block diagram illustrating a configuration of an IOP.

Subsequently, a configuration of the IOP 14 is explained with reference to FIG. 8. FIG. 8 is a functional block diagram illustrating the configuration of the IOP 14. As illustrated in FIG. 8, the IOP 14 includes a timestamp management table 51, a reference-path management table 52, a command processing unit 53, a path-state determining unit 54, a path selecting unit 55, a response receiving unit 56, a reference-path changing unit 57, and a power control unit 58.

The timestamp management table 51 stores therein information on a time relating to the command executing process. An example of information stored as the timestamp management table 51 is explained with reference to FIG. 9. FIG. 9 is a diagram illustrating an example of information stored as the timestamp management table 51.

As illustrated in FIG. 9, the timestamp management table 51 stores therein "path ID", "issue of CMD", "CMD_End time", and "Lock_End estimated time" in an associated manner.

Here, "path ID" indicates an identifier of a path. For example, in "path ID", "xxx2" identifying the path 2, "xxx3" identifying the path 3, "xxx4" identifying the path 4, and "xxx5" identifying the path 5 are stored.

Furthermore, "issue of CMD" indicates an issue time of a command. For example, in "issue of CMD", "00:05:003" indicating a time when a command was issued, "-" indicating that no command is issued, and the like are stored. Incidentally, in what follows, a time is expressed by an elapsed time since a device is powered on.

Moreover, "CMD_End time" indicates a time when the IOP 14 was notified of CMD_End by the CHEs 12*a* to 12*d*. For example, in "CMD_End time", "00:05:175" indicating a time when the IOP 14 was notified of CMD_End, "-" indicating that the IOP 14 has not notified of CMD_End, and the like are stored.

Furthermore, "Lock_End estimated time" indicates an estimated time of the end of the prohibition period. Here, the prohibition period is a value determined by a device, so this value does not vary while the device is in operation. Therefore, for example, the path-state determining unit 54 acquires a value of the prohibition period from the CHE when the device is powered on. Then, upon receipt of CMD End, the path-state determining unit 54 acquires a timestamp and calculates an estimated time of Lock_End. For example, in "Lock_End estimated time", "00:05:475" indicating an estimated time of Lock_End, "-" indicating that an estimated time of Lock_End has not been calculated, and the like are stored.

The timestamp management table 51 illustrated in FIG. 9 indicates that in the path 2, the execution of a command started at 5.003 seconds, and the execution of the command ended at 5.175 seconds. Furthermore, the timestamp management table 51 indicates that the path 2 is currently in the prohibition period, and the prohibition period will end at 5.475 seconds. Moreover, the timestamp management table 51 illustrated in FIG. 9 indicates that in the path 3, a command started at 5.137 seconds is being executed. Furthermore, the timestamp management table 51 illustrated in FIG. 9 indicates that the path states of the paths 4 and 5 are neither in process of command execution nor in the prohibition period.

Incidentally, "issue of CMD" stored here is stored by the path selecting unit 55 to be described below. Furthermore, a "CMD_End time" stored here is stored by the response receiving unit 56 to be described below. Moreover, a "Lock_End estimated time" stored here is stored by the path-state determining unit 54 to be described below.

The reference-path management table 52 stores therein information indicating which one of the CHEs 12*a* to 12*d* is a reference path. An example of information stored as the reference-path management table 52 is explained with reference to FIG. 10. FIG. 10 is a diagram illustrating an example of information stored as the reference-path management table 52.

As illustrated in FIG. 10, the reference-path management table 52 stores therein "path ID", "reference path flag", and "power flag" in an associated manner. Here, "path ID" is identical to that is stored as the timestamp management table 51.

A "reference path flag" indicates whether a path is a reference path. For example, in "reference path flag", "1" indicating that a path is a reference path and "0" indicating that a path is not a reference path are stored.

A "power flag" indicates whether the power to a path is on. For example, in "power flag", "ON" indicating that the power to a path is on and "OFF" indicating that the power to a path is off are stored.

The reference-path management table 52 illustrated in FIG. 10 indicates that the path 2 is a reference path, and the power to the path 2 is on. Furthermore, the reference-path management table 52 illustrated in FIG. 10 indicates that the power to the path 3 and the power to the path 4 are on. Moreover, the reference-path management table 52 illustrated in FIG. 10 indicates that the power to the path 5 is off. Incidentally, here, it is explained that the power to one path in the paths that the information processing system 1 includes is set to off when the server 10 is powered on; however, it is not limited to this. Furthermore, the power set to off can be set to on, for example, according to the load.

The command processing unit 53 accepts an instruction to issue a command from the CPU 13. Then, the command processing unit 53 notifies the path-state determining unit 54 of the acceptance of the instruction to issue a command. As a result, the path-state determining unit 54 determines the states of the paths. Furthermore, the command processing unit 53 issues the command specified in the instruction to a CHE connected to a path selected by the path selecting unit 55 as will be described below.

The path-state determining unit 54 determines the states of the paths in predetermined order starting from a reference path on the basis of information stored as the timestamp management table 51 when accepted the issue of a command from the CPU 13 via the command processing unit 53. Here, the reference path is a path of which the state is determined first in multiple paths. This reference path is set in advance. Furthermore, it is explained that the reference path can be changed while the server 10 is in operation; however, it is not limited to this, and it can be configured that the reference path can be fixed while the server 10 is in operation.

The path-state determining unit 54 identifies a reference path by reading out a value of "path ID" corresponding to a reference path flag of "1" from the reference-path management table 52. Then, the path-state determining unit 54 reads out respective values of "issue of CMD", "CMD_End time", and "Lock_End estimated time" corresponding to the identified path ID from the timestamp management table 51. And then, the path-state determining unit 54 determines the state of the path on the basis of the read values.

For example, when the value of "issue of CMD" is "-", the path-state determining unit 54 determines that the state of the path is neither in process of command execution nor in the prohibition period. Namely, in this case, the path-state determining unit 54 determines that the state of the path is IDLE.

On the other hand, when the value of "issue of CMD" is not "-", the path-state determining unit 54 determines that the state of the path is in process of command execution or in the prohibition period. In this case, when the values of "CMD_End time" and "Lock_End estimated time" are both "-", the path-state determining unit 54 determines that the state of the path is in process of command execution. Namely, in this case, the path-state determining unit 54 determines that the state of the path is Execute.

When the values of "CMD_End time" and "Lock_End estimated time" are not "-", the path-state determining unit 54 determines that the state of the path is in the prohibition period. Namely, in this case, the path-state determining unit 54 determines that the state of the path is CMD_End.

Furthermore, when determined that the state of the reference path is not IDLE, the path-state determining unit 54 determines the state of the next path based on the predetermined order. Here, the predetermined order is ascending order of path ID. For example, when the path 2 is set as a reference path in the information processing system 1, the path-state determining unit 54 determines the path state in order of the path 2, the path 3, the path 4, and the path 5. Furthermore, after the path 5, the path-state determining unit 54 determines the state of the path 2. Incidentally, the predetermined order is not limited to this, and can be arbitrarily set.

The path-state determining unit 54 outputs a result of the determination to the path selecting unit 55. For example, the path-state determining unit 54 outputs, as a result of the determination, information indicating that there is a path which is neither in process of command execution nor in the prohibition period to the path selecting unit 55. Furthermore, the path-state determining unit 54 outputs, as a result of the determination, information indicating that there is no path which is neither in process of command execution nor in the prohibition period but there is a path which is in the prohibition period to the path selecting unit 55. Moreover, the path-state determining unit 54 outputs, as a result of the determination, information indicating that all the paths are in process of command execution to the path selecting unit 55.

The path selecting unit 55 selects any one of multiple paths to be issued with a command on the basis of the states of the paths determined by the path-state determining unit 54. For example, when the path-state determining unit 54 has determined that there is a path which is neither in process of command execution nor in the prohibition period, the path selecting unit 55 selects the path as a path for command execution.

Furthermore, when the path-state determining unit 54 has determined that there is no path which is neither in process of command execution nor in the prohibition period, the path selecting unit 55 selects a path which has completed the process of command execution but has not passed through the prohibition period as a path for command execution.

Here, when the path-state determining unit 54 has determined that there are multiple paths which have completed the process of command execution but have not passed through the prohibition period, the path selecting unit 55 selects one of the multiple paths having the shortest remaining time of the prohibition period as a path for command execution.

Moreover, when the path-state determining unit 54 has determined that all the paths are in process of command execution, the path selecting unit 55 causes the path-state determining unit 54 to determine whether there is any path which is neither in process of command execution nor in the prohibition period again after the elapse of a predetermined period of time.

The response receiving unit 56 receives a notification of CMD_End indicating completion of command execution from the CHEs 12a to 12d. Upon receipt of CMD_End, the response receiving unit 56 stores a time when the response receiving unit 56 received the CMD_End in "CMD_End time" of the timestamp management table 51.

The reference-path changing unit 57 reads out the timestamp management table 51, and when all paths being in process of command execution have passed through the prohibition periods, the reference-path changing unit 57 changes the "reference path flag" stored as the reference-path management table 52. For example, when the path 2 has been set as a reference path, and the paths 2, 3, and 4 have issued with commands, and then the paths 2, 3, and 4 have passed through the prohibition period, the reference-path changing unit 57 changes the reference path from the path 2 to the path 3 by performing the following process. Namely, the reference-path changing unit 57 changes the "reference path flag" corresponding to "xxx2" in "path ID" of the reference-path management table 52 to "0", and changes the "reference path flag" corresponding to "xxx3" in "path ID" to "1".

When the reference path is changed from one path to another by the reference-path changing unit 57, the power control unit 58 controls to turn off the power to the one path. Furthermore, when the reference path is changed to another path by the reference-path changing unit 57, the power control unit 58 controls to turn on the power to the another path.

For example, when the reference path stored as the reference-path management table 52 is changed from a path of which the "path ID" is "xxx2" to a path of which the "path ID" is "xxx3" by the reference-path changing unit 57, the power control unit 58 performs the following process. Namely, the power control unit 58 changes the "power flag" corresponding to "xxx2" in "path ID" to "OFF", and changes the "power flag" corresponding to "xxx3" in "path ID" to "ON". Furthermore, the power control unit 58 causes the corresponding CHEs to control to turn on the power to the path of which the "path ID" is "xxx2" and turn off the power to the path of which the "path ID" is "xxx3".

Operation of Process Performed by IOP According to First Embodiment

Subsequently, the operation of the process performed by the IOP 14 according to the first embodiment is explained with reference to FIGS. 11 to 13. Here, the operation of the path selecting process performed by the IOP when there is a path which is neither in process of command execution nor in the prohibition period is explained with reference to FIG. 11. Furthermore, the operation of the path selecting process performed by the IOP when there is no path which is neither in process of command execution nor in the prohibition period is explained with reference to FIG. 12. Then, the operation of a reference-path changing process performed by the IOP is explained with reference to FIG. 13. Incidentally, in the explanation below, there is described the path 2 as a reference path.

Figure 11:
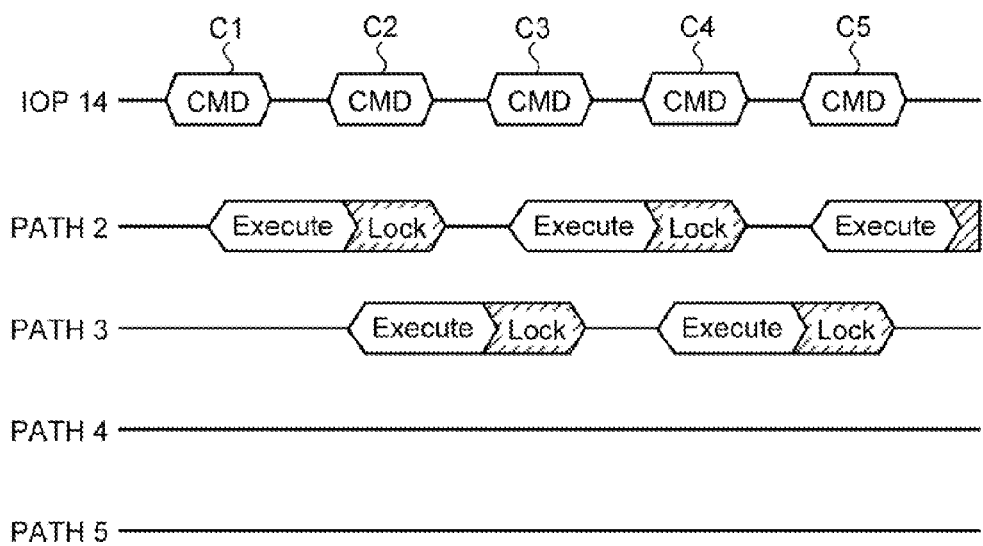
FIG. 11 is a diagram illustrating the operation of the path selecting process when there is a path which is neither in process of command execution nor in the prohibition period.

FIG. 11 is a diagram illustrating the operation of the path selecting process when there is a path which is neither in process of command execution nor in the prohibition period. As illustrated in FIG. 11, when the IOP 14 has accepted an instruction to issue a command C1 from the CPU 13, the state of the path 2 is IDLE, so the IOP 14 issues the command to the CHE 12*a* connected to the path 2. Then, when the IOP 14 has accepted an instruction to issue a command C2 from the CPU 13, the state of the path 2 is Execute and the state of the path 3 is IDLE, so the IOP 14 issues the command to the CHE 12*b* connected to the path 3.

And then, when the IOP 14 has accepted an instruction to issue a command C3 from the CPU 13, the state of the path 2 is IDLE, so the IOP 14 issues the command to the CHE 12*a* connected to the path 2. And then, when the IOP 14 has accepted an instruction to issue a command C4 from the CPU 13, the state of the path 2 is Execute and the state of the path 3 is IDLE, so the IOP 14 issues the command to the CHE 12*b* connected to the path 3.

And then, when the IOP 14 has accepted an instruction to issue a command C5 from the CPU 13, the state of the path 2 is IDLE, so the IOP 14 issues the command to the CHE 12*a* connected to the path 2.

Figure 12:
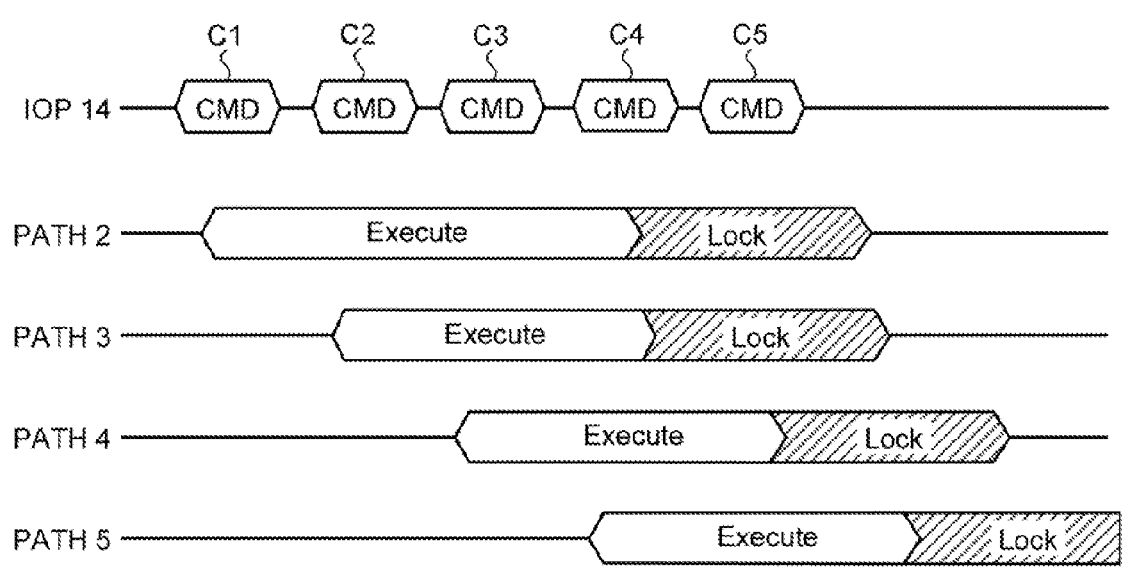
FIG. 12 is a diagram illustrating the operation of the path selecting process when there is no path which is neither in process of command execution nor in the prohibition period.

FIG. 12 is a diagram illustrating the operation of the path selecting process when there is no path which is neither in process of command execution nor in the prohibition period. As illustrated in FIG. 12, when the IOP 14 has accepted an instruction to issue a command C1 from the CPU 13, the state of the path 2 is IDLE, so the IOP 14 issues the command to the CHE 12*a* connected to the path 2. Then, when the IOP 14 has accepted an instruction to issue a command C2 from the CPU 13, the state of the path 2 is Execute and the state of the path 3 is IDLE, so the IOP 14 issues the command to the CHE 12*b* connected to the path 3.

And then, when the IOP 14 has accepted an instruction to issue a command C3 from the CPU 13, the states of the paths 2 and 3 are Execute and the state of the path 4 is IDLE, so the IOP 14 issues the command to the CHE 12*c* connected to the path 4. And then, when the IOP 14 has accepted an instruction to issue a command C4 from the CPU 13, the states of the paths 2, 3, and 4 are Execute and the state of the path 5 is IDLE, so the IOP 14 issues the command to the CHE 12*d* connected to the path 5.

And then, when the TOP 14 has accepted an instruction to issue a command C5 from the CPU 13, the states of the paths 2 and 3 are Lock and the states of the paths 4 and 5 are Execute. Namely, none of the paths is in IDLE state. Therefore, the IOP 14 issues the command to the CHE 12*a* connected to the path 2 which is in the prohibition period or the CHE 12*b* connected to the path 3 which is in the prohibition period. Here, the IOP 14 selects the path 2 as a path having the shortest remaining time of the prohibition period out of the paths 2 and 3, and issues the command to the CHE 12*a* connected to the path 2.

Figure 13:
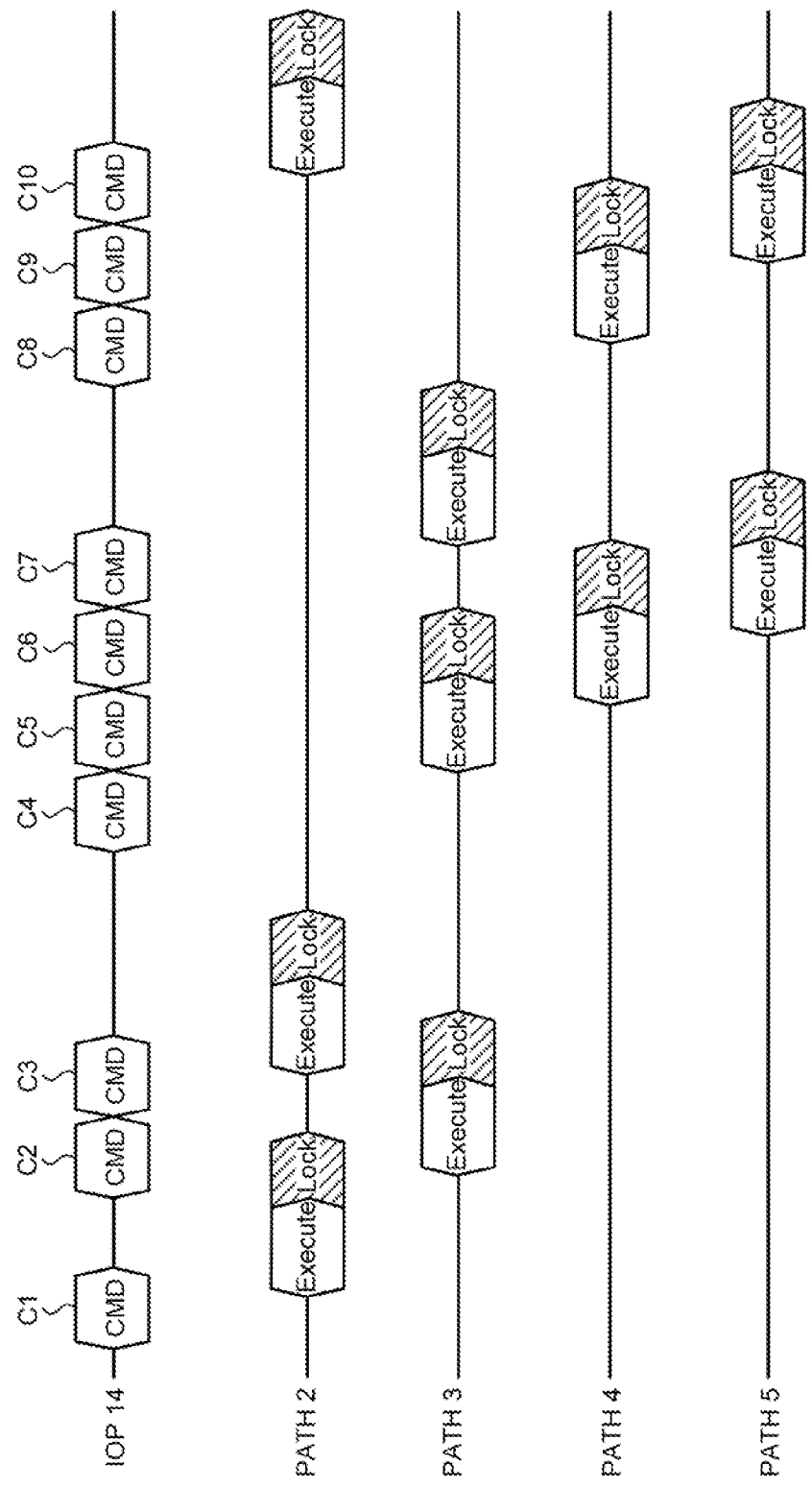
FIG. 13 is a diagram illustrating the operation of a reference-path changing process performed by the IOP.

FIG. 13 is a diagram illustrating the operation of the reference-path changing process performed by the IOP 14. As illustrated in FIG. 13, when the IOP 14 has accepted an instruction to issue a command C1 from the CPU 13, the state of the path 2 is IDLE, so the IOP 14 issues the command to the CHE 12*a* connected to the path 2. Then, when the IOP 14 has accepted an instruction to issue a command C2 from the CPU 13, the state of the path 2 is Execute and the state of the path 3 is IDLE, so the IOP 14 issues the command to the CHE 12*b* connected to the path 3.

And then, when the IOP 14 has accepted an instruction to issue a command C3 from the CPU 13, the state of the path 2 is IDLE, so the IOP 14 issues the command to the CHE 12*a* connected to the path 2.

And then, when the IOP 14 has accepted an instruction to issue a command C4 from the CPU 13, the execution of the commands C1, C2, and C3 has been completed, and the paths 2 and 3 have passed through the prohibition period. Here, the IOP 14 changes the reference path from the path 2 to the path 3. Then, as the state of the path 3 is IDLE, the IOP 14 issues the command to the CHE 12*b* connected to the path 3.

And then, when the IOP 14 has accepted an instruction to issue a command C5 from the CPU 13, the state of the path 3 is Execute and the state of the path 4 is IDLE, so the IOP 14 issues the command to the CHE 12*c* connected to the path 4. And then, when the IOP 14 has accepted an instruction to issue a command C6 from the CPU 13, the states of the paths 3 and 4 are Execute and the state of the path 5 is IDLE, so the IOP 14 issues the command to the CHE 12d connected to the path 5.

And then, when the IOP 14 has accepted an instruction to issue a command C7 from the CPU 13, the state of the path 3 is IDLE, so the IOP 14 issues the command to the CHE 12b connected to the path 3.

And then, when the IOP 14 has accepted an instruction to issue a command C8 from the CPU 13, the execution of the commands C4, C5, C6, and C7 has been completed, and the paths 3, 4, and 5 have passed through the prohibition period. Here, the IOP 14 changes the reference path from the path 3 to the path 4. Then, as the state of the path 4 is IDLE, the IOP 14 issues the command to the CHE 12c connected to the path 4.

And then, when the IOP 14 has accepted an instruction to issue a command C9 from the CPU 13, the state of the path 4 is Execute and the state of the path 5 is IDLE, so the IOP 14 issues the command to the CHE 12d connected to the path 5. And then, when the IOP 14 has accepted an instruction to issue a command C10 from the CPU 13, the state of the path 4 is Lock, the state of the path 5 is Execute, and the state of the path 2 is IDLE, so the IOP 14 issues the command to the CHE 12a connected to the path 2.

Processing Procedure of Process Performed by IOP According to First Embodiment

Subsequently, a processing procedure of the process performed by the IOP 14 according to the first embodiment is explained with reference to FIGS. 14 and 15. Here, a command issuing process performed by the IOP is explained with reference to FIG. 14, and the path selecting process performed by the IOP is explained with reference to FIG. 15.

Command Issuing Process

Figure 14:
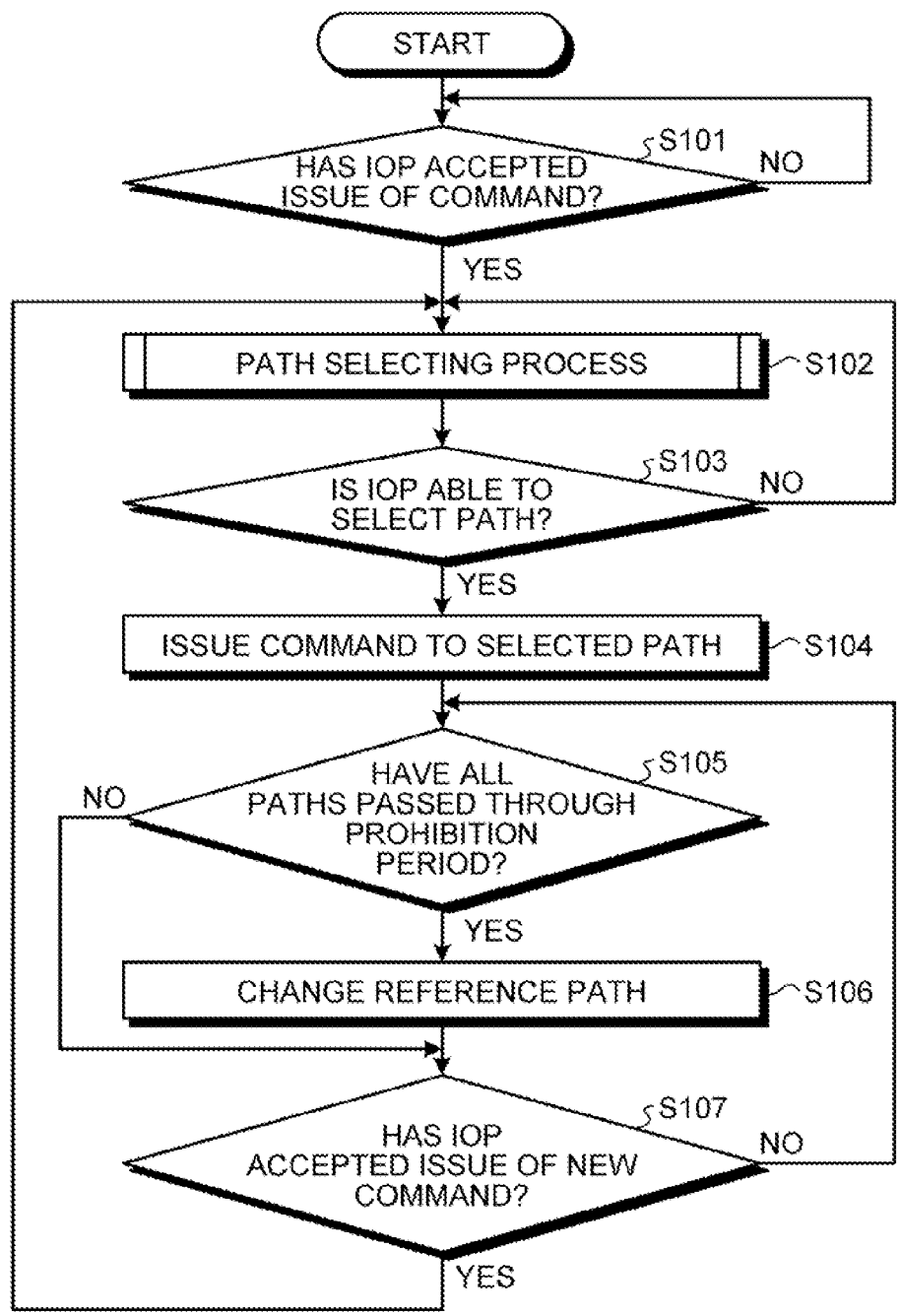
FIG. 14 is a flowchart illustrating a processing procedure of a command issuing process performed by the IOP according to the first embodiment.

FIG. 14 is a flowchart illustrating a processing procedure of the command issuing process performed by the IOP 14 according to the first embodiment. The IOP 14 performs this process, for example, upon acceptance of an instruction to issue a command.

As illustrated in FIG. 14, the IOP 14 determines whether the IOP 14 has accepted an instruction to issue a command (Step S101). Here, when determined that the IOP 14 has accepted an instruction to issue a command (YES at Step S101), the IOP 14 performs the path selecting process (Step S102). On the other hand, when determined that the IOP 14 has not accepted an instruction to issue a command (NO at Step S101), the IOP 14 continuously determines whether the IOP 14 has accepted an instruction to issue a command.

Then, the IOP 14 determines whether the IOP 14 is able to select a path as a result of the path selecting process (Step S103). Here, when determined that the IOP 14 is not able to select a path (NO at Step S103), after the elapse of a predetermined period of time, the IOP 14 moves back to Step S102 and performs the path selecting process again.

On the other hand, when determined that the IOP 14 is able to select a path (YES at Step S103), the IOP 14 issues the command to a CHE connected to the selected path (Step S104). Then, the IOP 14 determines whether all paths issued with a command have passed through the prohibition period (Step S105). Here, when determined that all paths have passed through the prohibition period (YES at Step S105), the IOP 14 changes the reference path (Step S106), and moves onto Step S107.

On the other hand, when determined that any of the all paths has not passed through the prohibition period (NO at Step S105), the IOP 14 moves onto Step S107.

At Step S107, the IOP 14 determines whether the IOP 14 has accepted an instruction to issue a new command. Here, when determined that the IOP 14 has not accepted an instruction to issue a new command (NO at Step S107), the IOP 14 moves back to Step S105. On the other hand, when determined that the IOP 14 has accepted an instruction to issue a new command (YES at Step S107), the IOP 14 moves back to Step S102.

Path Selecting Process

Figure 15:
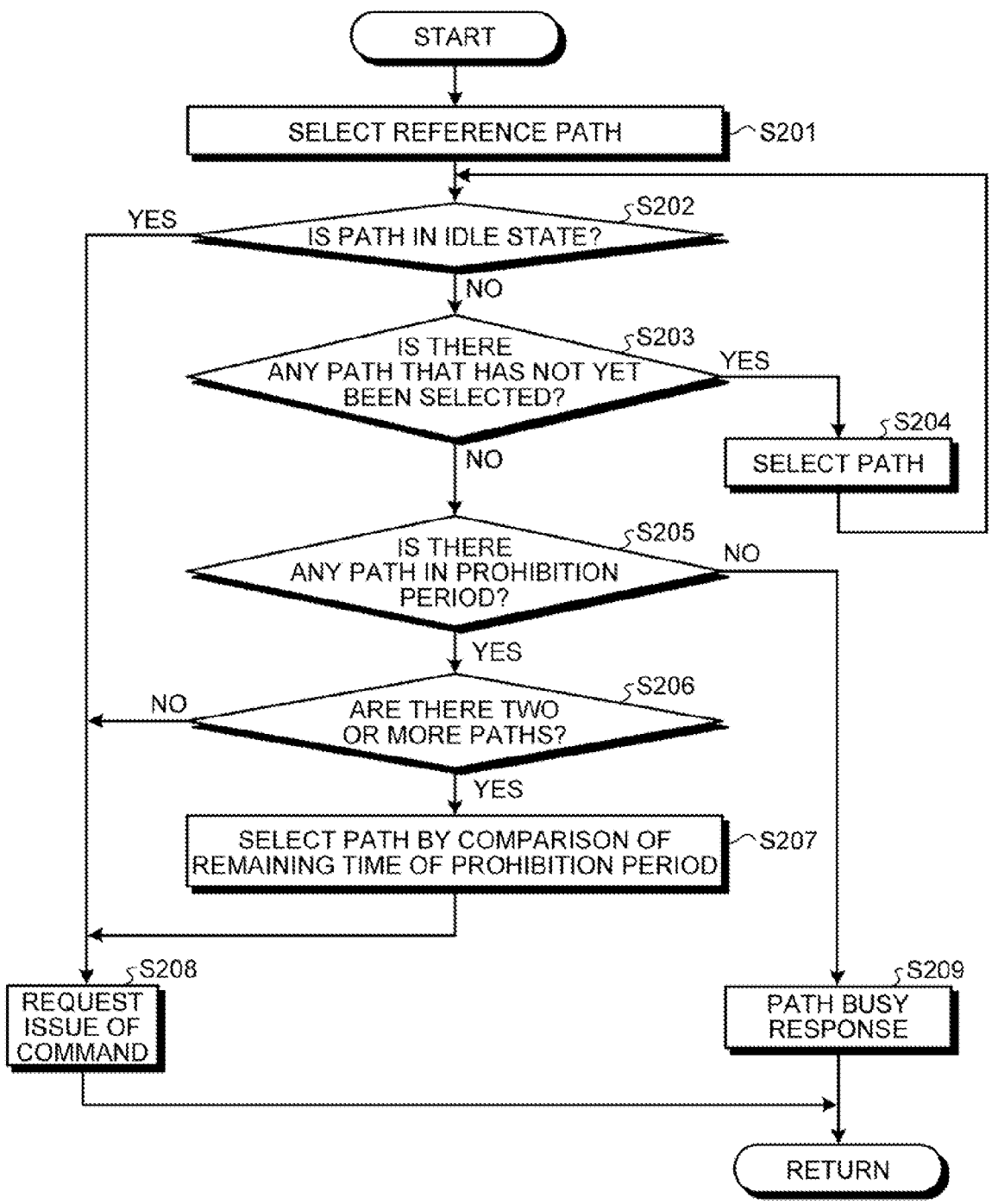
FIG. 15 is a flowchart illustrating a processing procedure of the path selecting process performed by the IOP according to the first embodiment.
Figure 16:
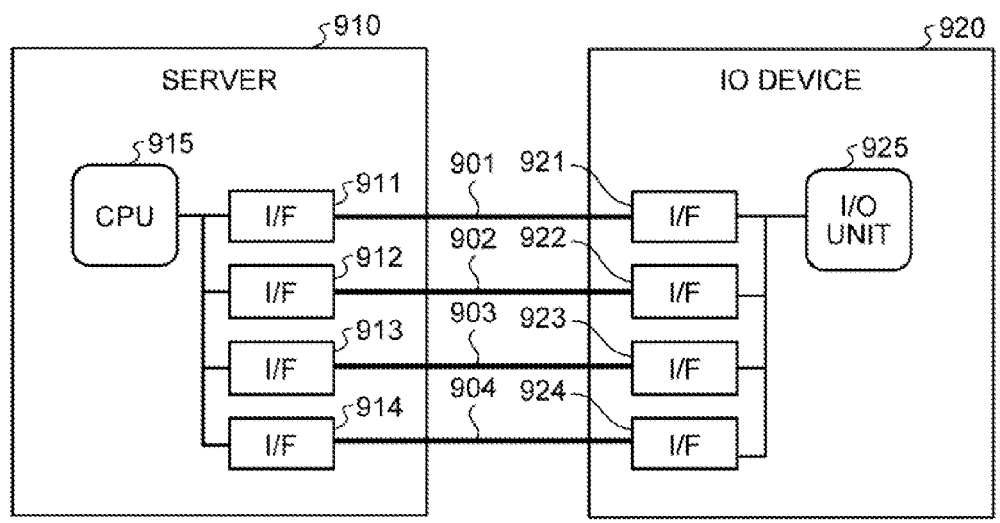
FIG. 16 is a diagram illustrating a configuration of a server that executes input/output processing with an IO device.
Figure 17:
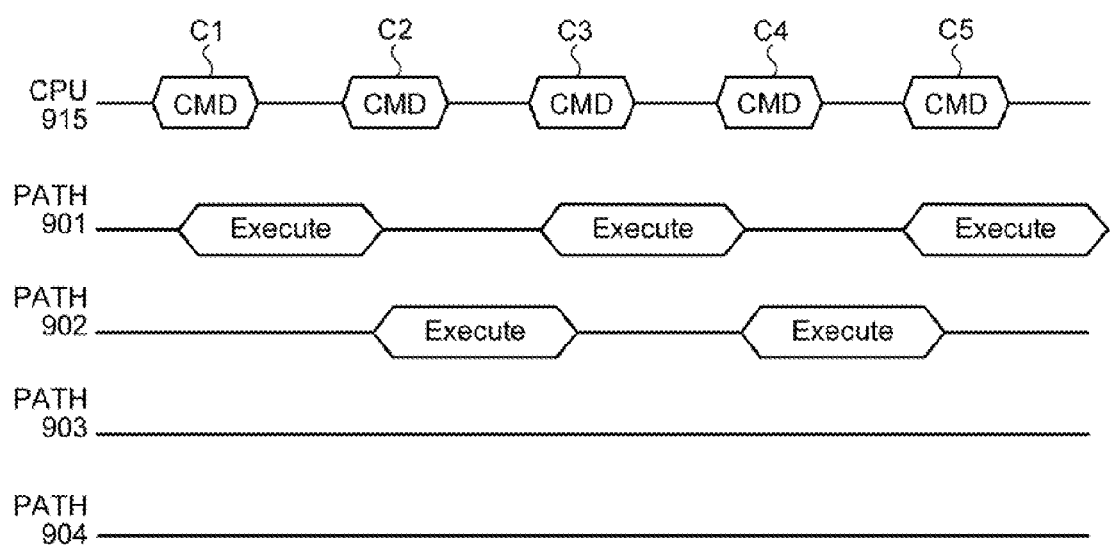
FIG. 17 is a diagram illustrating a path selecting method when a reference path has been set.
Figure 18:
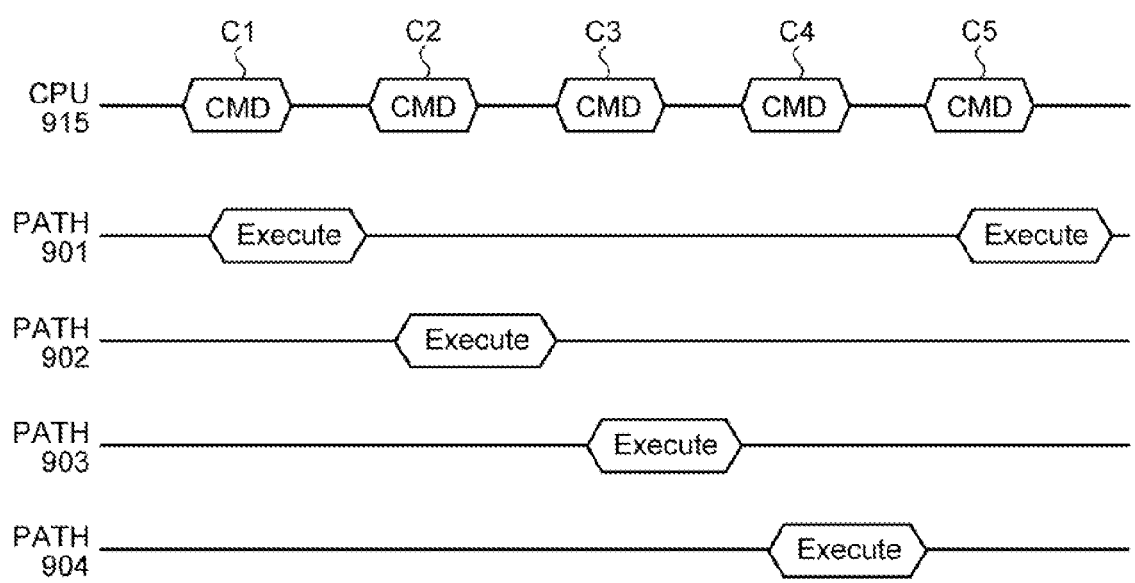
FIG. 18 is a diagram illustrating a path selecting method in round-robin fashion.

FIG. 15 is a flowchart illustrating a processing procedure of the path selecting process performed by the IOP 14 according to the first embodiment. Incidentally, this process corresponds to Step S102 illustrated in FIG. 14. Furthermore, the flowchart illustrated in FIG. 15 indicates a case where paths connecting the server 10 to the IO device 20 are four paths: the paths 2 to 5.

As illustrated in FIG. 15, the IOP 14 selects a reference path (Step S201). Then, the IOP 14 determines whether the selected path is in IDLE state (Step S202). Here, when determined that the selected path is in IDLE state (YES at Step S202), the IOP 14 gives a response requesting the issue of a command to a CHE connected to the selected path (Step S208), and ends the process.

On the other hand, when determined that the selected path is not in IDLE state (NO at Step S202), the IOP 14 determines whether there is any path that has not yet been selected (Step S203).

Here, when determined that there is a path that has not yet been selected (YES at Step S203), the IOP 14 selects the new path (Step S204), and moves back to Step S202 and performs Step S202 and the subsequent steps. On the other hand, when determined that there is no path that has not yet been selected (NO at Step S203), the IOP 14 determines whether there is any path which is in the prohibition period (Step S205).

Here, when determined that there is no path which is in the prohibition period (NO at Step S205), the IOP 14 gives a "Path Busy Response" to the CPU 13 that has requested the issue of the command (Step S209), and ends the process. Incidentally, the "Path Busy Response" is a response indicating that none of the paths is in IDLE state.

On the other hand, when determined that there is a path which is in the prohibition period (YES at Step S205), the IOP 14 determines whether there are two or more paths which are in the prohibition period (Step S206). Here, when determined that there are two or more paths which are in the prohibition period (YES at Step S206), the IOP 14 makes a comparison of the remaining time of the prohibition period among the paths, and selects one of the paths having the shortest remaining time (Step S207). Then, the IOP 14 gives a response requesting the issue of a command to a CHE connected to the selected path (Step S208), and ends the process.

On the other hand, when determined that there are not two or more paths which are in the prohibition period (NO at Step S206), the IOP 14 gives a response requesting the issue of a command to a CHE connected to the path which is in the prohibition period (Step S208), and ends the process.

Effects of First Embodiment

As described above, in the present first embodiment, it is possible to reduce heat generation of a component installed in the CHEs 12a to 12d.

Furthermore, when it is determined that there are multiple paths which have completed the process of command execution but have not passed through the prohibition period, the IOP 14 selects one of the paths having the shortest remaining time of the prohibition period as a path for command execution. As a result, it is possible to use paths more efficiently.

Moreover, the IOP 14 changes a reference path, and this makes it possible to prevent a particular path from being worn by heat generation. Furthermore, when changed the reference path from one path to another, the IOP 14 controls to turn off the power to the one path. As a result, it is possible to reduce power consumption.

Moreover, the IOP 14 acquires a timestamp at the time of issue of CMD and a timestamp at the time of CMD End. By using these timestamps, the remaining time of the prohibition period can be easily calculated, and comparison of the prohibition period can be made more easily. Furthermore, the IOP 14 can be configured to manage the command issue interval. Moreover, by using the timestamps, the prohibition period can be changed in accordance with the command execution interval.

[b] Second Embodiment

Besides the embodiment described above, the present invention can be implemented in various different forms. In a second embodiment, the other forms included in the present invention are explained.

System Configuration, etc.

Out of the processes described in the present embodiment, all or part of the process described as an automatically-performed one can be manually performed. Or, all or part of the process described as a manually-performed one can be automatically performed by a publicly-known method. In addition, the processing procedures, control procedures, and specific names illustrated in the above description and the drawings can be arbitrarily changed unless otherwise specified.

The server 10 is described as a mainframe server; however, the server 10 is not limited to this. For example, the server 10 can be implemented as an open system server if the server 10 includes a chipset having the same functions as the IOP 14 and an interface (IF) card capable of setting the prohibition period as the CHE is.

Furthermore, information stored in the storage unit illustrated in the drawing is just an example, and information does not exactly have to be stored as illustrated in the drawing. For example, the timestamp management table 51 can store information on the calculated remaining time of the prohibition period.

The path-state determining unit 54 can be configured to determine that a path has passed through the prohibition period when acquired a prohibition completion response indicating completion of the prohibition period from the path.

Furthermore, a value of the prohibition period given to the IOP 14 at the time of power-on can be a coefficient instead of a time. Then, the IOP 14 calculates a time of the prohibition period by multiplying a command execution time by the received coefficient. Consequently, it is possible to avoid the problem that a time required for heat dissipation is increased due to the fact that the longer execution time a command requires, the higher the temperature of an element is raised.

Moreover, the order of steps of each of the processes explained in the above embodiment can be changed according to various loads or use conditions. For example, in the process illustrated in FIG. 14, after Step S104, the process can skip to Step S107 without performing Steps S105 and S106.

Furthermore, components illustrated in the drawings are functionally conceptual ones, and do not always have to be physically configured as illustrated in the drawings. For example, in the IOP 14, the command processing unit 53 and the path-state determining unit 54 can be integrated into one unit. Moreover, all or any part of processing functions implemented in a device can be realized by a CPU and a program to be analyzed and executed by the CPU, or can be realized as hardware by wired logic.

It is possible to use paths efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control device comprising a processing circuitry that executes a process comprising:
determining whether there is any path, out of multiple paths connecting the communication control device to a communication partner device, which is neither in process of data transmission nor in a prohibition period in which data transmission is prohibited for a predetermined time since the last data transmission has been completed; and
selecting a path which has completed data transmission but has not passed through the prohibition period as a path for data transmission when it is determined that all paths are either in process of data transmission or in the prohibition period in a condition where all paths have high-loads, loads on the paths being classified under a low-load, a medium-load and the high-load.

2. The communication control device according to claim 1, wherein the selecting includes selecting, when it is determined that there are multiple paths which have completed data transmission but have not passed through the prohibition period, one of the multiple paths having the shortest remaining time of the prohibition period as a path for data transmission.

3. The communication control device according to claim 1, further comprising switching a reference path, which is the first path to be determined whether there is any path which is neither in process of data transmission nor in the prohibition period out of the multiple paths, when all paths, which have completed data transmission, pass through the prohibition period on the basis of predetermined order.

4. The communication control device according to claim 1, wherein the selecting includes selecting, when it is determined that there is a path which is neither in process of data transmission nor in the prohibition period, the path as a path for data transmission.

5. The communication control device according to claim 1, wherein the determining includes determining, when it is determined that all the paths are in process of data transmission, whether there is any path which is neither in process of data transmission nor in the prohibition period again after the elapse of a certain period of time.

6. The communication control device according to claim 1, wherein the determining includes determining, when the communication control device acquires a prohibition completion response indicating completion of the prohibition period from any path, that the path has passed through the prohibition period.

7. The communication control device according to claim 1, wherein the determining includes acquiring a transmission completion response indicating completion of data transmission from any path and determining whether the path has passed through the prohibition period on the basis of the prohibition period read out from a storage unit, which stores therein the prohibition period in advance, and a time when the transmission completion response is acquired.

8. The communication control device according to claim 1, wherein the prohibition period is set according to a period of time required to dissipate heat generated by data transmission.

9. An information processing apparatus comprising:
a plurality of interface units that are provided for respective multiple paths and perform data transmission to a communication partner device connected via the multiple paths; and
a communication control unit that assigns any of the interface units data transmission to the communication partner device, wherein each of the interface units sets a prohibition period in which new data transmission is prohibited for a predetermined period of time since the last data transmission has been completed,
when all interface units are either in process of data transmission or in the prohibition period but there is an interface unit which is in the prohibition period in a state where all interface units have high-loads, loads on the interface units being classified under a low-load, a medium-load and the high-load, the communication control unit assigns the new data transmission to the interface unit which is in the prohibition period.

10. A path selecting method for a communication control device to select a path, the path selecting method comprising:
using a processing circuitry, determining whether there is any path, out of multiple paths connecting the communication control device to a communication partner device, which is neither in process of data transmission nor in a prohibition period in which data transmission is prohibited for a predetermined time since the last data transmission has been completed; and
using the processing circuitry, selecting a path which has completed data transmission but has not passed through the prohibition period as a path for data transmission when it is determined that all paths are either in process of data transmission or in the prohibition period in a condition where all paths have high-loads, loads on the paths being classified under a low-load, a medium-load and the high-load.

11. The path selecting method according to claim 10, wherein the selecting includes selecting, when it is determined that there are multiple paths which have completed data transmission but have not passed through the prohibition period, one of the multiple paths having the shortest remaining time of the prohibition period as a path for data transmission.

12. The path selecting method according to claim 10, further comprising, using the processing circuitry, switching a reference path, which is the first path to be determined whether there is any path which is neither in process of data transmission nor in the prohibition period out of the multiple paths, when all paths, which have completed data transmission, pass through the prohibition period on the basis of predetermined order.

13. The path selecting method according to claim 10, wherein the selecting includes selecting, when it is determined that there is a path which is neither in process of data transmission nor in the prohibition period, the path as a path for data transmission.

14. The path selecting method according to claim 10, wherein the determining includes determining, when it is determined that all the paths are in process of data transmission, whether there is any path which is neither in process of data transmission nor in the prohibition period again after the elapse of a certain period of time.

15. The path selecting method according to claim 10, wherein the determining includes determining, when the communication control device acquires a prohibition completion response indicating completion of the prohibition period from any path, that the path has passed through the prohibition period.

16. The path selecting method according to claim 10, wherein the determining includes acquiring a transmission completion response indicating completion of data transmission from any path and determining whether the path has passed through the prohibition period on the basis of the prohibition period read out from a storage unit, which stores therein the prohibition period in advance, and a time when the transmission completion response is acquired.

17. The path selecting method according to claim 10, wherein the prohibition period is set according to a period of time required to dissipate heat generated by data transmission.

18. The communication control device according to claim 1, further comprising an interface that performs the date transmission to the communication partner device, a temperature of the interface rising in process of data transmission, wherein,
in accordance with the heat dissipation of the interface, a length of the prohibition period is set based on a time until the temperature of the interface decreases to a threshold by completion of the data transmission.

19. The communication control device according to claim 1, wherein, in the condition where all paths have high-loads, a next command is issued before the end of the prohibition period since a last issued command has been executed, and all the paths is not available.

* * * * *